US007991552B2

(12) United States Patent
Samuel et al.

(10) Patent No.: US 7,991,552 B2
(45) Date of Patent: Aug. 2, 2011

(54) SYSTEM AND METHOD FOR DETERMINING A SIDE-IMPACT COLLISION STATUS OF A NEARBY VEHICLE

(75) Inventors: Stephen Samuel, Troy, MI (US); Christopher Nave, Ypsilanti, MI (US); W. Trent Yopp, Canton, MI (US); Roger Arnold Trombley, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 393 days.

(21) Appl. No.: 12/266,231

(22) Filed: Nov. 6, 2008

(65) Prior Publication Data

US 2010/0114418 A1    May 6, 2010

(51) Int. Cl.
*G08G 1/16* (2006.01)
*B60W 30/08* (2006.01)
*B60W 40/04* (2006.01)

(52) U.S. Cl. ......... 701/301; 701/117; 340/901; 340/933

(58) Field of Classification Search .............. 701/1, 224, 701/300–302, 117–119; 340/901–904, 933–943, 340/425.5, 435, 436; 342/70–72; 382/103, 382/104, 107
See application file for complete search history.

(56) References Cited

U.S. PATENT DOCUMENTS

| | | | |
|---|---|---|---|
| 5,165,108 A * | 11/1992 | Asayama | 340/435 |
| 5,339,075 A * | 8/1994 | Abst et al. | 340/903 |
| 5,652,705 A * | 7/1997 | Spiess | 701/117 |
| 5,699,040 A | 12/1997 | Matsuda et al. | |
| 5,805,103 A | 9/1998 | Doi et al. | |
| 5,892,439 A | 4/1999 | Torres et al. | |
| 6,011,492 A | 1/2000 | Garesche | |
| 6,037,860 A * | 3/2000 | Zander et al. | 340/436 |
| 6,188,940 B1 | 2/2001 | Blackburn et al. | |
| 6,202,027 B1 | 3/2001 | Alland et al. | |
| 6,278,360 B1 | 8/2001 | Yanagi et al. | |
| 6,327,536 B1 * | 12/2001 | Tsuji et al. | 701/301 |
| 6,370,461 B1 | 4/2002 | Pierce et al. | |
| 6,480,102 B1 | 11/2002 | Miller et al. | |
| 6,502,034 B1 | 12/2002 | Miller | |
| 6,567,737 B2 * | 5/2003 | Nakamura et al. | 701/301 |

(Continued)

FOREIGN PATENT DOCUMENTS

GB    2 268 608    1/1994

OTHER PUBLICATIONS

Kamijo et al., Traffic Monitoring and Accident Detection at Intersections, Jun. 2000, IEEE Transactions on Intelligent Transportation Systems, vol. 1, No. 2, pp. 108-118.*

(Continued)

*Primary Examiner* — Thomas G Black
*Assistant Examiner* — Lindsay M Browder
(74) *Attorney, Agent, or Firm* — Franklin MacKenzie; Ford Global Technologies, LLC

(57) ABSTRACT

A system and method are provided to determine the side-impact collision status of a nearby vehicle or vehicles. If a nearby vehicle has been in a collision, responsive systems may be triggered automatically. Responses may include warning the driver of the host vehicle and/or warning drivers of other vehicles or centralized networks by, among other methods, V2V or V2I communications. Responses may also include automatically triggering countermeasures in the host vehicle.

20 Claims, 4 Drawing Sheets

U.S. PATENT DOCUMENTS

| | | | |
|---|---|---|---|
| 6,615,137 B2 * | 9/2003 | Lutter et al. | 701/301 |
| 6,650,983 B1 * | 11/2003 | Rao et al. | 701/45 |
| 6,658,355 B2 | 12/2003 | Miller et al. | |
| 6,684,149 B2 | 1/2004 | Nakamura et al. | |
| 6,691,018 B1 | 2/2004 | Miyahara | |
| 6,714,139 B2 * | 3/2004 | Saito et al. | 340/903 |
| 6,721,659 B2 * | 4/2004 | Stopczynski | 701/301 |
| 6,728,617 B2 * | 4/2004 | Rao et al. | 701/45 |
| 6,753,804 B2 | 6/2004 | Miyahara | |
| 6,768,446 B2 | 7/2004 | Tamatsu et al. | |
| 6,804,602 B2 * | 10/2004 | Impson et al. | 701/117 |
| 6,819,991 B2 | 11/2004 | Rao et al. | |
| 6,894,608 B1 * | 5/2005 | Gunderson | 340/468 |
| 6,925,378 B2 | 8/2005 | Tzamaloukas | |
| 6,944,543 B2 | 9/2005 | Prakah-Asante et al. | |
| 6,985,089 B2 | 1/2006 | Liu et al. | |
| 7,124,027 B1 * | 10/2006 | Ernst et al. | 701/301 |
| 7,188,012 B2 | 3/2007 | Salmeen et al. | |
| 7,243,013 B2 | 7/2007 | Rao et al. | |
| 7,245,231 B2 | 7/2007 | Kiefer et al. | |
| 7,260,461 B2 | 8/2007 | Rao et al. | |
| 7,263,209 B2 | 8/2007 | Camus et al. | |
| 7,289,019 B1 * | 10/2007 | Kertes | 340/435 |
| 7,343,235 B2 | 3/2008 | Isaji et al. | |
| 7,418,346 B2 | 8/2008 | Breed et al. | |
| 7,427,929 B2 * | 9/2008 | Bauer et al. | 340/905 |
| 7,437,246 B2 * | 10/2008 | Kelly et al. | 701/301 |
| 7,526,382 B2 * | 4/2009 | Gleacher et al. | 701/301 |
| 7,579,942 B2 * | 8/2009 | Kalik | 340/435 |
| 7,742,864 B2 * | 6/2010 | Sekiguchi | 701/96 |
| 7,804,413 B2 * | 9/2010 | Birk et al. | 340/576 |
| 2007/0096892 A1 * | 5/2007 | Nathan et al. | 340/471 |
| 2007/0168104 A1 | 7/2007 | Nelson et al. | |
| 2007/0255480 A1 | 11/2007 | Southall et al. | |
| 2008/0041297 A1 | 2/2008 | Vazin | |
| 2008/0042825 A1 * | 2/2008 | Denny et al. | 340/522 |
| 2008/0140287 A1 * | 6/2008 | Yang et al. | 701/45 |
| 2008/0215231 A1 * | 9/2008 | Breed | 701/117 |
| 2009/0021355 A1 * | 1/2009 | Meister et al. | 340/425.5 |

OTHER PUBLICATIONS

Sun et al., On-Road Vehicle Detection: A Review, May 2006, IEEE Transactions on Pattern Analysis and Machine Intelligence, vol. 28, No. 5, pp. 694-711.*

Sun et al., On-Road Vehicle Detection Using Optical Sensors: A Review, Oct. 2004, 2004 IEEE Intelligent Transportation Systems Conference, pp. 585-590.*

Yang et al., A Vehicle-to-Vehicle Communication Protocol for Cooperative Collision Warning, Aug. 2004, The First Annual International Conference on Mobile and Ubiquitous Systems: Networking and Services (MOBIQUITOUS 2004), p. 114.*

Srinivasa, Vision-Based Vehicle Detection and Tracking Method for Forward Collision Warning in Automobiles, 2002, IEEE Intelligent Vehicle Symposium 2002, vol. 2, pp. 626-631.*

* cited by examiner

SYSTEM AND METHOD FOR DETERMINING A SIDE-IMPACT COLLISION STATUS OF A NEARBY VEHICLE

TECHNICAL FIELD

This disclosure relates to sensing systems for automotive vehicles to determine whether a nearby vehicle or vehicles have been in a side-impact collision; and if so, responding accordingly.

BACKGROUND

Drivers of host vehicles have a constantly growing amount of information to observe and process to maneuver safely while driving on the open road. Drivers must not only know about and adhere to the rules of the road in their own right, but they must also be aware of what nearby vehicles are doing. To complicate the issue, nearby vehicles do not always behave in a predictable manner.

Drivers face these challenges in addition to an ever-increasing number of distractions, including radios, ringing cell phones, passengers demanding attention, and the like. For this reason, it may be challenging to determine whether a nearby vehicle has been involved in a side-impact collision in a timely manner. As a corollary, it may be difficult for drivers to respond quickly and appropriately to a nearby side-impact collision.

Existing crash sensing systems do not identify the side-impact collision status of nearby vehicles; that is, whether a nearby vehicle has been in a side-impact, and respond accordingly with warnings to a host driver, other drivers, or countermeasures such as automatic application of brakes, tensioning of seat belts, or pre-arming of air bags.

It is therefore desirable to provide systems and methods for identifying the side-impact collision status of nearby vehicles. It is also desirable to provide systems and methods for responding to the side-impact collision status of nearby vehicles and for identifying non-drivable paths as well as available and preferred driving paths. It is desirable to provide a warning to a driver of a host vehicle, as well as to drivers of other vehicles and to infrastructure support systems. It is also desirable to automatically apply countermeasures when appropriate, especially if a driver of a host vehicle is distracted or otherwise prevented from doing so.

SUMMARY

Systems and methods are provided to address, at least in part, one or more of the needs or desires left unaddressed by prior systems and methods.

A system for determining the side-impact collision status of nearby vehicles is provided. The system includes a mechanism for detecting a presence of the vehicle. The system also includes a controller for determining the lateral displacement of the vehicle in predetermined time intervals and comparing same to threshold values to determine the side-impact collision status of the vehicle. Additionally, if the system determines that the side-impact collision status of the vehicle is positive, a signal is configured to trigger a response.

A method of avoiding a collision is also provided. The method comprises a step of determining a side-impact collision status of a vehicle based upon lateral displacement in predetermined time intervals. If the magnitude of the displacement is higher than predetermined threshold values, the side-impact collision status of the vehicle is positive. The method also includes a step of automatically responding to the side-impact collision status of the vehicle.

DETAILED DESCRIPTION

Figure 1:
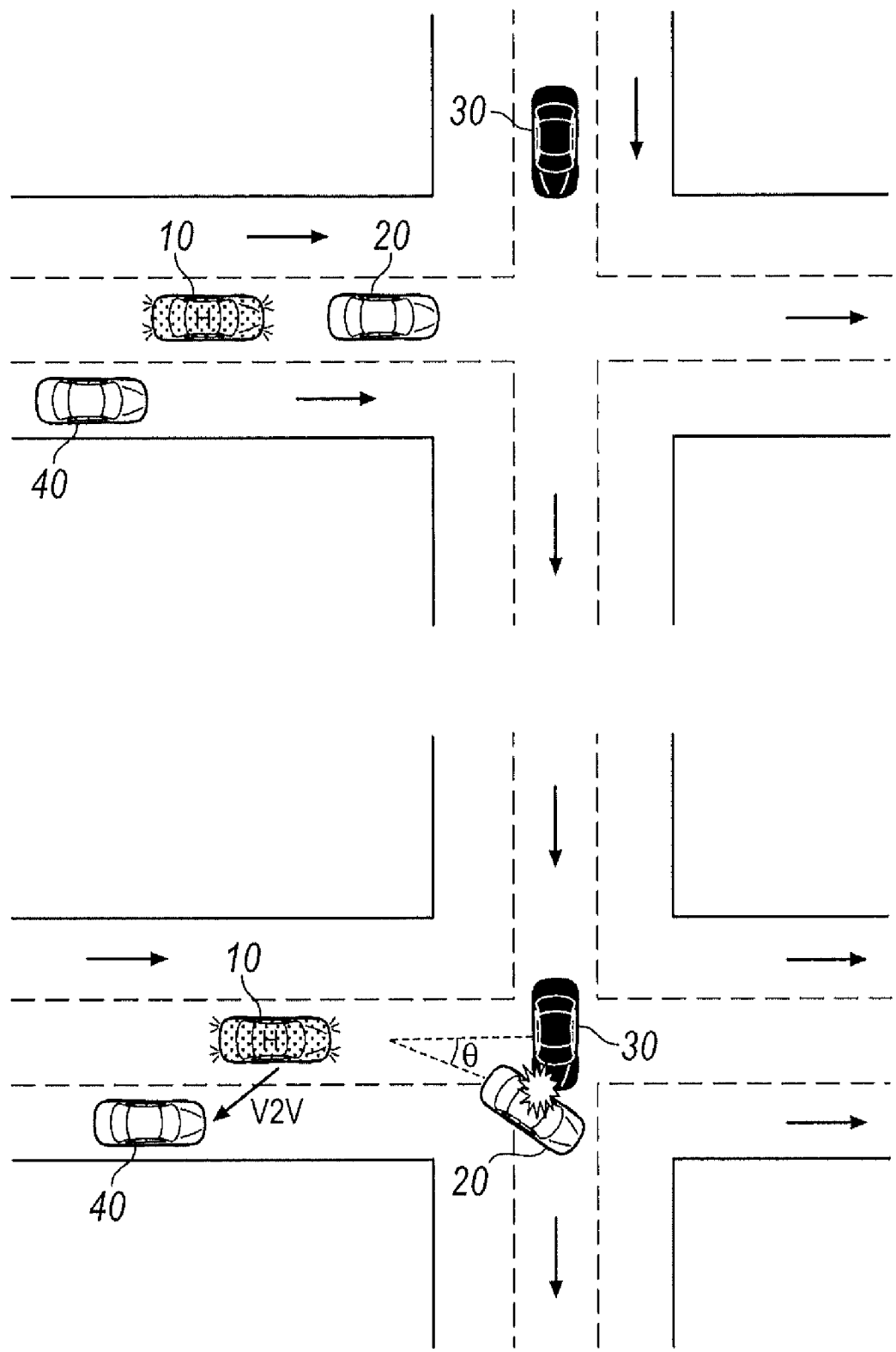
FIG. 1 is an exemplary depiction of a host vehicle detecting and communicating the side-impact collision status of a nearby vehicle.

In FIG. 1, a host vehicle 10 is shown traveling in the same direction as two nearby vehicles 20 and 40. Nearby vehicle 30 is traveling in a substantially perpendicular direction. Eventually, vehicles 20 and 30 collide. In this example, the host vehicle 10 detects the side-impact collision status of vehicle 20 as positive for at least the reason that the change in the lateral displacement of vehicle 20 during a predetermined time interval or intervals falls outside of predetermined threshold values for such lateral displacement.

In this non-limiting example, vehicle 20 had been traveling in the same longitudinal path as host vehicle 10. At the moment of crash, vehicle 20 has a heading angle $\theta$ between its initial direction of travel and its current direction of travel resulting from a side impact. That change in heading angle $\theta$ occurred within a certain time interval. If the magnitude of heading angle $\theta$ is larger than predetermined thresholds for predetermined time intervals, it may be determined that vehicle 20 has been in a side-impact collision.

When, as in FIG. 1, it is determined that vehicle 20 has been in a side-impact collision, host vehicle 10 provides a warning to the driver in host vehicle 10 as well as to other drivers such as the driver of nearby vehicle 40 of the sensed side-impact collision. Any known warning methods and mechanisms may be used to alert the drivers of the collision. FIG. 1 illustrates a few exemplary non-limiting warning methods and mechanisms. The driver in vehicle 40 is being alerted of a general driving hazard by the flashing hazard lights of the host vehicle 10. The driver in vehicle 40 is also being alerted of the specific problem that a nearby side-impact collision has occurred, in front of vehicle 40 in the non-limiting depiction, by vehicle-to-vehicle (V2V) alerts or communications initiated by host vehicle 10. Such communications may also include information about detected non-drivable paths, available driving paths, and/or preferred driving paths. Other types of communications are contemplated for use with the systems described herein, including vehicle-to-infrastructure (V2I) communications. The infrastructure can then communicate with equipped vehicles 40 as well as dispatch emergency services, traffic flow warning systems, and the like. Mechanisms and methods for detecting the collision status of a nearby vehicle, as well as warning systems associated therewith are described in more detail herein.

Figure 2:
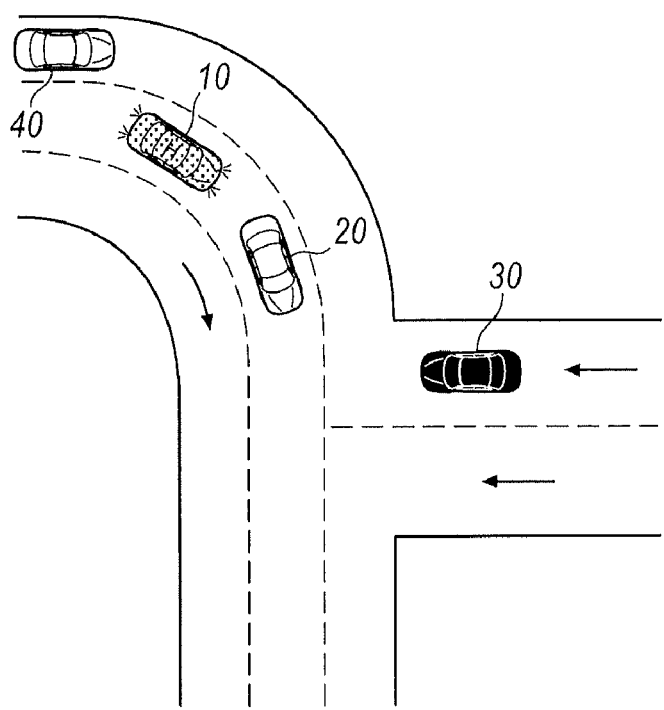
FIG. 2 is an exemplary depiction of a host vehicle detecting and communicating the side-impact collision status of a nearby vehicle.
Figure 2:
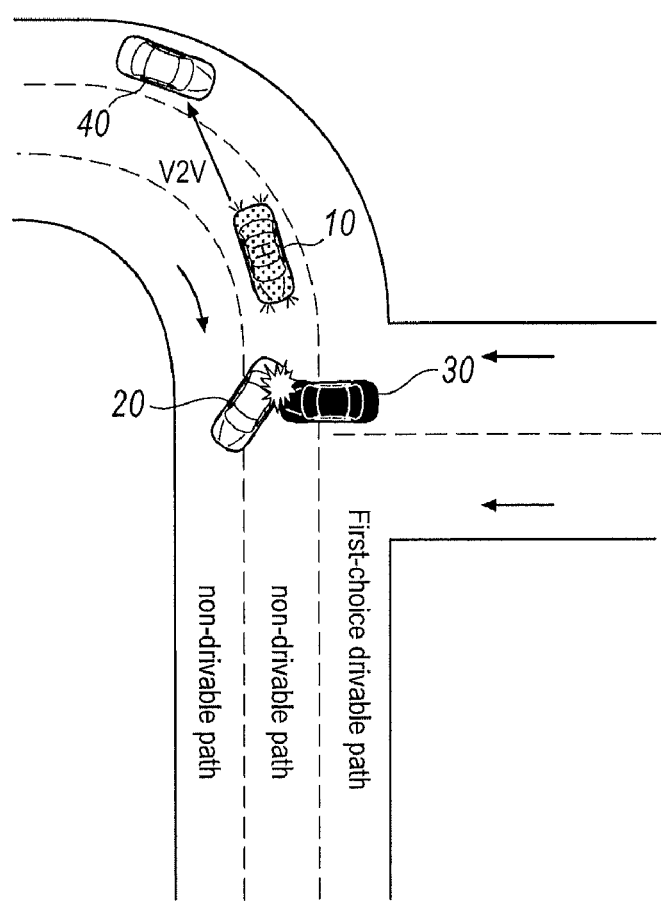

In FIG. 2, a host vehicle 10 is shown in traffic on a curved road wherein vehicles 10, 20, and 40 are traveling in the same general path. Vehicle 30 is traveling in a direction that is substantially perpendicular to the other vehicles. Eventually, vehicles 20 and 30 collide outside of the visual field of view for the driver of vehicle 40. The host vehicle 10 determines that the collision status of vehicle 20 is positive based at least in part on the lateral displacement of the vehicle 20 per predetermined time intervals. As noted above, this can be determined by the change in heading angle θ per predetermined time intervals.

The host vehicle 10 then provides a warning to the driver in host vehicle 10 as well as to other drivers such as the driver of nearby vehicle 40 of the sensed collision. In FIG. 2, the driver in vehicle 40 is being alerted of a general driving hazard by V2V communications initiated by host vehicle 10. The V2V communication may optionally contain non-drivable path information as well as available and preferred driving paths. Such communications may also be made V2I to an infrastructure such as a centralized network. In FIG. 2, sensors and/or other equipment on the host vehicle 10 are able to determine which paths are drivable on the curved road. The depiction shows the lanes in which the collision occurred are non-drivable paths, and the other lane is drivable. In the non-limiting example, a system on host vehicle 10 is able to determine that the lane furthest from the collision is a first-choice drivable path. A system may be able to determine the existence of several drivable paths and select preferred drivable paths among the choices. The drivable path information is also able to be communicated to equipped vehicles 40 via V2V alerts or communications and/or to specialized infrastructure using V2I alerts or communications.

Figure 3:
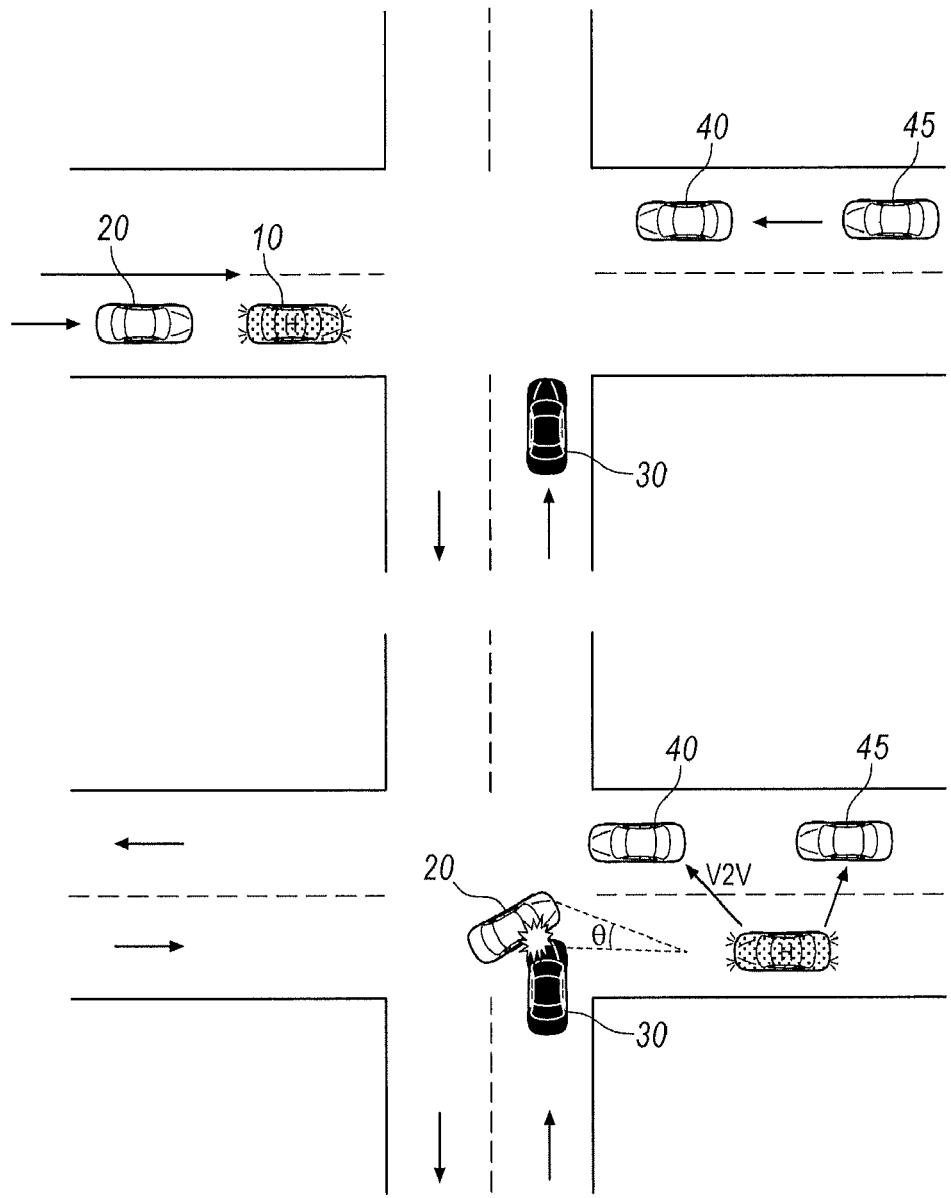
FIG. 3 is an exemplary depiction of a host vehicle detecting and communicating the side-impact collision status of a nearby vehicle.

In FIG. 3, the host vehicle 10 is traveling in a lane in the same direction as nearby vehicle 20. Vehicles 40 and 45 are traveling in the opposite direction on the same road in an adjacent lane. Vehicle 30 is traveling in a direction perpendicular to the direction of travel of vehicles 10, 20 and 40. Vehicles 20 and 30 collide, and the host vehicle 10 determines that the side-impact collision status of vehicle 20, to its rear but within the field of view of its sensing system, is positive based at least in part upon the lateral motion or lateral displacement of vehicle 20 per predetermined time intervals. This may be determined via any known in the method including the use of the change heading angle θ per predetermined time intervals. In FIG. 3, host vehicle 10 is depicted as initiating V2V communications to nearby equipped vehicles 40 and 45 to notify them of the side-impact collision status of vehicle 20. Communications may optionally notify equipped infrastructure or equipped vehicles of any non-drivable path in their vicinity as well as of any available drivable paths plus which among the available paths is preferred.

Figure 4:
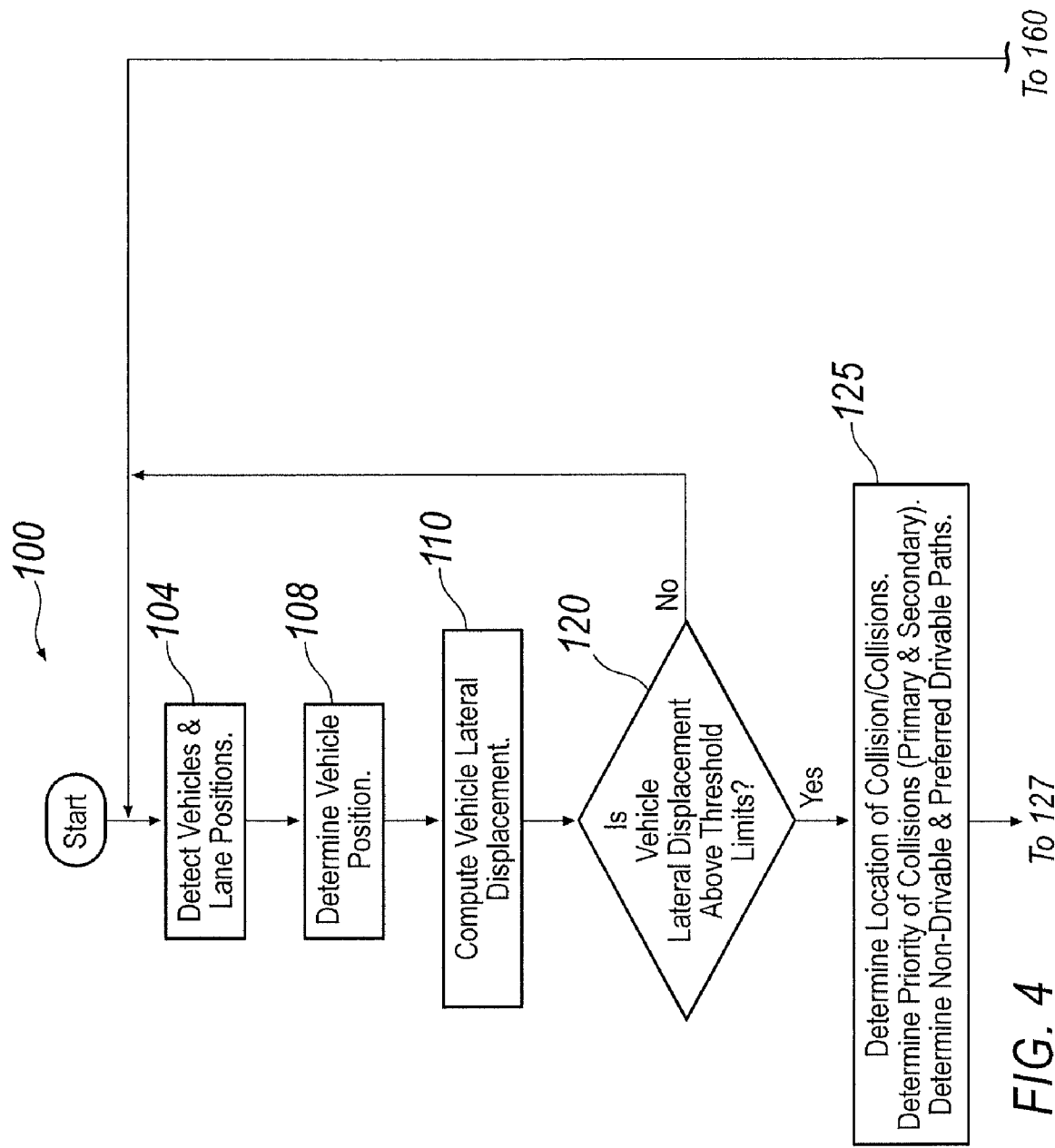
FIG. 4 is a flow chart providing logic for detecting a collision status and responding to the collision status.

In FIG. 4, an exemplary flow chart is provided for a system for use in avoiding a collision with one or more nearby vehicles that have been in a side-impact collision. All or some of the steps in FIG. 4 may be implemented in particular commercial systems.

In starting oval 100, a system may be turned on or off to detect whether a collision has occurred near a host vehicle. That is, the host vehicle may be configured to evaluate the side-impact collision status of a nearby vehicle.

Processing step box 104 shows that one or more sensors may be used to detect nearby vehicles and the lane positions of one or more nearby vehicles. The presence of a nearby vehicle may be detected using a vision system, such as the one described in U.S. Pat. No. 7,263,209, which is incorporated herein in its entirety. Additionally, sensors including radar sensors and lidar sensors may be used on a host vehicle to sense the presence of a nearby vehicle (a vehicle within the field of view of at least one of the sensors) from a host vehicle. Other known sensing systems for determining the distance between a host vehicle and a nearby vehicle are also contemplated. Nearby vehicles need not be in front of the host vehicle; they may be positioned in any direction from the host vehicle so long as the sensing system on the host vehicle has a field of view in which the nearby vehicle falls.

Processing step box 108 shows the determination of the location of the nearby vehicle. This data may be useful in determining whether the nearby vehicle's lateral displacement is within expected ranges. Location determination may be performed using any known method or system.

Processing step box 110 shows the computation of the lateral displacement of a nearby vehicle using heading angle θ of the nearby vehicle or vehicles.

Decision diamond 120 provides exemplary logic for determining the side-impact collision status of a nearby vehicle. As is known, a nearby vehicle that has been in a side-impact collision may be unexpectedly veer from its travel of direction. The veering direction will have a lateral displacement component outside of expected ranges. The lateral displacement per time interval can be determined from, among other input, the speed of the nearby vehicle and the change in the heading angle θ of the nearby vehicle. By way of non-limiting example, at an initial time $t_0$, a nearby vehicle is moving longitudinally forward in a straight direction. At time interval $t_1$, the nearby vehicle has moved its driving path so that the heading angle θ is the angle between the first driving path and the second driving path. At time interval $t_2$, the nearby vehicle has again moved its driving path, changing the heading angle θ.

Certain changes in heading angle θ are expected, such as the changes resulting from a turn or from lane changes. It is possible to gather expected or tolerated ranges for acceptable changes in heading angle θ for time intervals and store that data in tables for comparison to measured or sensed changes in heading angle θ over predetermined time intervals. Tolerated ranges and predetermined thresholds can be calculated, obtained, recorded, modified and/or stored using any known method, mechanism, system or device.

If a change of heading angle of a nearby vehicle is outside of a predetermined threshold(s), the side-impact collision status of the nearby vehicle is positive. That is, the nearby vehicle has been in a side-impact collision. If it is determined that the nearby vehicle has not been in a side-impact collision, then the collision status is negative and the system may return to starting oval 100. If the collision status is positive, then a controller may include logic that causes a series of related determinations to be made. For example, processing box 125 allows for the determination of the location of any detected side-impact collision or collisions. Processing box 125 also suggests that logic may be included to determine whether a detected collision is primary or secondary. If multiple side-impact collisions are detected, then the collisions may also be classified according to level of risk presented to the driver of the host vehicle for prioritization. Processing box 125 also suggests that a determination of non-drivable paths, and drivable paths, and preferred drivable paths be detected. To make this determination, sensors may identify non-drivable paths and available drivable paths, and provide input to a controller to determine and select preferred driving paths among the choices of available drivable paths. Such a prioritizing of drivable paths is exemplified in FIG. 2.

If the side-impact collision status is positive, a controller causes a signal to be sent to trigger a response. As exemplified in decision diamond 127, the response to the detected collision or collisions may be ordered according to the classification of risk presented to the host vehicle.

A response can additionally be tailored to the relative location of the nearby vehicle or vehicles that have been in a side-impact collision. For example, if the side-impact collision status of a nearby vehicle that is in driving path of the host vehicle is positive, then an in-path collision is detected as shown in hexagon condition 130. Then, any one or more of the responses in processing box 135 may be initiated. The particular responses listed in processing box 135 are merely exemplary and not intended to be limiting. For example, a general or specific warning may be provided to the driver of the host vehicle. The warning may be haptic, auditory or visual or a combination thereof. For example, a dashboard light display could be made to flash the words "CRASH HAZARD AHEAD" while a voice recording announced "Crash Hazard Ahead." Alternatively, a general auditory warning could be issued such as an alarm, chime or buzzer.

Specific warnings may also be provided to alert drivers of other vehicles and/or to alert road traffic systems. For example, a specific warning about a particular collision may be transmitted from the host vehicle to alert drivers of other vehicles that are equipped to receive V2V communications. V2V is technology that is designed to allow vehicles to "talk" to each other. V2V systems may use a region of the 5.9 gigahertz band, the unlicensed frequency also used by WiFi. Exemplary suitable V2V systems and protocols are disclosed in U.S. Pat. Nos. 6,925,378, 6,985,089, and 7,418,346, each of which is incorporated by reference in its entirety. Similarly, the host vehicle may alert road traffic systems or other infrastructure of the detected accident using V2I systems or cooperative vehicle-infrastructure systems (CVIS). V2I systems are identified in U.S. Patent Publication No. 20070168104, which is incorporated by reference in its entirety. Such an infrastructure or centralized network may trigger communications to initiate emergency responses, such as police, ambulance, fire, and the like. It may also be used to provide input to traffic signal systems and the like.

The specific V2V or V2I warning about the detected side-impact collision or collisions may be coupled with information about non-drivable paths, drivable paths and preferred paths. By way of non-limiting examples, the warning may include a statement such as "MOVE INTO RIGHT LANE" or "AVOID LEFT LANE," or the warning might rank drivable paths as first choice or a second choice. The V2V drivable lane communication may be particularly useful when other vehicles adapted to receive V2V information cannot see the host vehicle or the collision involving the nearby vehicle, as shown in FIG. 2.

General warnings may also be provided to alert drivers of other nearby vehicles of a hazard. For example, a general warning may originate from the host vehicle. The warning may be auditory or visual or both. The warning may be as simple as blowing the horn on the host vehicle, causing the brake lights on the host vehicle to be illuminated or causing the hazard lights on the host vehicle to begin flashing.

Other response systems may be triggered as shown in processing box 135. For example, countermeasures may be employed according to the characteristics of the detected collision or collisions. If a side-impact collision status is determined to be positive for an in-path nearby vehicle, one response may be to automatically apply the brakes of the host vehicle. Another response may be to pre-tension safety belts or provide input into an air bag deployment algorithm to pre-arm the system for a potentially quicker response when a collision occurs that involves the host vehicle.

The response systems can be tailored according to the physical location of the vehicle or vehicles that have a positive side-impact collision status. For example, if the controller determines that a nearby vehicle in the rear/side of the host vehicle has been in a side-impact collision (condition hexagon 140), then certain response systems may be more useful than they would be if the side-impact collision had occurred to a nearby vehicle that is on the front/side of the host vehicle (condition hexagon 150). The responses in processing box 145, among others, may be used where the accident or side-impact collision occurs behind the host vehicle or behind the host vehicle and also to its side. These responses include alerting the driver of the host vehicle, alerting drivers of nearby vehicles of the accident and of drivable route information, and providing general alerts such as activating the hazards lights and/or horn of the host vehicle. The responses may also include alerting a road traffic system using V2I. Countermeasures may also be activated, but are less likely to be necessary when an accident occurs that the host vehicle has already passed, as exemplified in FIG. 4.

The responses in processing box 155, among others, may be used where the accident or side-impact collision occurs in front of the host vehicle and/or to the side of the host vehicle. These responses include alerting the driver of the host vehicle, alerting drivers of nearby vehicles of the accident and of drivable route information, and providing general alerts such as activating the hazards lights and/or horn of the host vehicle. The responses may also include alerting a road traffic system using V2I. Countermeasures may be desired when an accident occurs to the front or to the side of the host vehicle, as exemplified in FIG. 5.

In decision diamond 160, it is determined whether the host vehicle has responded to all of the detected or sensed side-impact collisions. If not, the logic returns to decision diamond 127 to address the remaining side-impact collisions. If all collisions have been addressed, then the logic returns to starting oval 100.

The systems and methods described herein may be used in conjunction with other pre-crash sensing systems and warning/countermeasure systems, and may share components and/or logic with said systems. For example, it is contemplated that a host vehicle with the above-disclosed system may also employ the methods and apparatuses disclosed in U.S. Pat. Nos. 6,188,940, 6,370,461, 6,480,102, 6,502,034, 6,658,355, 6,819,991, 6,944,543, 7,188,012, 7243,013 and 7,260,461, each of which is incorporated by reference in its entirety.

Figure 5:
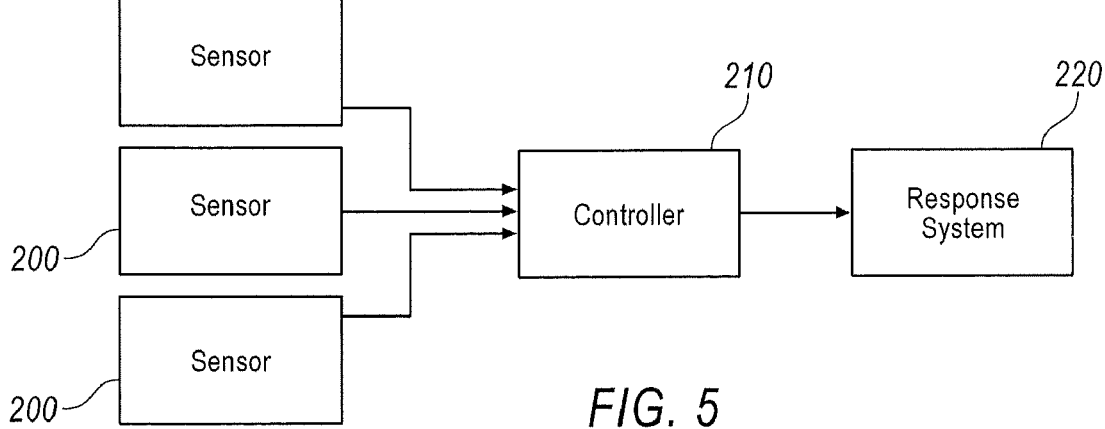
FIG. 5 is a schematic of a system for detecting a collision status and responding to the collision status.

In FIG. 5, an illustrative schematic is shown for a system of attempting to avoid a collision with a nearby vehicle that has been in a side-impact collision. Sensors 200 provide input to controller 210 regarding data relevant to the lateral motion of the nearby vehicle. As noted above, sensors 200 may be vision-based, radar, lidar, or combinations thereof. Controller 210 includes logic to determine if the change in lateral displacement of the nearby vehicle his greater than a pre-determined threshold. Any known method of calculating the change in lateral motion may be used, including those that use a heading angle θ which is the angle between the longitudinal direction of travel of the nearby vehicle before impact and its direction of travel following impact. If the change in lateral displacement of the nearby vehicle exceeds the predetermined threshold, then the side-impact collision status of the nearby vehicle is positive and the controller 210 causes a signal to be sent to one or more response systems 220, as noted above. The response system 220 may warn the driver of the host vehicle and/or other vehicles, and may initiate countermeasures.

While at least one embodiment of the appended claims has been described in the specification, those skilled in the art recognize that the words used are words of description, and not words of limitation. Many variations and modifications are possible without departing from the scope and spirit of the invention as set forth in the appended claims.

We claim:

1. A system installable on a host vehicle for determining a side-impact collision status of a remote vehicle and responding to same, the system comprising;
   (a) a mechanism for detecting a presence of the remote vehicle;
   (b) a controller for determining the lateral displacement of the remote vehicle in predetermined time intervals and comparing same to threshold values to determine the side-impact collision status of the remote vehicle; and
   (c) if the remote vehicle has been in a side-impact collision, a signal is configured to trigger a response.

2. The system of claim 1 wherein the mechanism is a sensing system that comprises at least one of a radar sensor, a lidar sensor or a vision-based sensor.

3. The system of claim 1 wherein the mechanism comprises vehicle-to-vehicle communications.

4. The system of claim 1 wherein the response is a visual warning in the host vehicle.

5. The system of claim 1 wherein the response is an audible warning in the host vehicle.

6. The system of claim 1 wherein the response is as haptic warning in the host vehicle.

7. The system of claim 1 wherein the response is to alert drivers of other vehicles of the collision status of the remote nearby vehicle via vehicle-to-vehicle communications.

8. The system of claim 1 wherein the response is to alert drivers of other vehicles of the collision status of the remote vehicle via setting hazard lights of the host vehicle to on.

9. The system of claim 1 wherein the response is the application of at least one countermeasure.

10. The system of claim 1 further comprising: (d) if the vehicle has been in a side-impact collision, an apparatus for identifying non-drivable paths, drivable paths, and preferred drivable paths.

11. The system of claim 10 further comprising a controller for selecting preferred drivable paths among available drivable paths.

12. The system of claim 10 further comprising: (e) a signal configured to trigger an audio or visual alert in the host vehicle that identifies one or more of non-drivable, drivable and preferred drivable path information.

13. A method of avoiding a collision, comprising, from a host vehicle:
   (a) determining a side-impact collision status of a remote vehicle based upon lateral displacement of the remote vehicle in predetermined time intervals relative to the remote vehicle's longitudinal direction of travel and comparing measured lateral displacement to predetermined thresholds to determine if the side-impact collision status is positive; and
   (b) automatically responding to the side-impact collision status.

14. The method of claim 13 wherein the automatically responding step comprises providing a visual warning to a driver of the host vehicle.

15. The method of claim 13 wherein the automatically responding step comprises providing an audible warning to a driver of the host vehicle.

16. The method of claim 13 wherein the automatically responding step comprises providing a haptic warning to a driver of the host vehicle.

17. The method of claim 13 wherein the automatically responding step comprises providing a warning to drivers of other vehicles via vehicle-to-vehicle communications.

18. The method of claim 13 wherein the automatically responding step comprises providing a warning to drivers of other vehicles via turning on hazard lights on the host vehicle.

19. The method of claim 13 wherein the automatically responding step comprises applying at least one countermeasure.

20. A system installable on a host vehicle for determining a side-impact collision status of a remote vehicle and responding to same, the system comprising;
   (a) a mechanism for detecting a presence of the remote vehicle;
   (b) a controller for determining the lateral displacement of the remote vehicle in predetermined time intervals and comparing same to threshold values to determine the side-impact collision status of the remote vehicle;
   (c) if the remote vehicle has been in a side-impact collision, a signal is configured to trigger a response; and
   (d) if the remote vehicle has been in a side-impact collision, an apparatus for identifying non-drivable paths, drivable paths, and preferred drivable paths wherein driving path information is communicated to the host vehicle via vehicle-to-vehicle or vehicle-to-infrastructure communication.

* * * * *